United States Patent
Wöhrle

(10) Patent No.: US 7,732,795 B2
(45) Date of Patent: Jun. 8, 2010

(54) CIRCUIT ARRANGEMENT FOR THE ELECTRICAL ISOLATION OF SIGNAL LINES

(75) Inventor: Siegbert Wöhrle, Schiltach (DE)

(73) Assignee: Vega Grieshaber KG, Wolfach (DE)

( * ) Notice: Subject to any disclaimer, the term of this patent is extended or adjusted under 35 U.S.C. 154(b) by 688 days.

(21) Appl. No.: 11/645,738

(22) Filed: Dec. 27, 2006

(65) Prior Publication Data

US 2007/0171686 A1 Jul. 26, 2007

Related U.S. Application Data

(60) Provisional application No. 60/764,379, filed on Feb. 2, 2006.

(30) Foreign Application Priority Data

Jan. 26, 2006 (DE) .................. 10 2006 003 952

(51) Int. Cl.
G02B 27/00 (2006.01)
(52) U.S. Cl. ..................................... 250/551
(58) Field of Classification Search ............... 250/551
See application file for complete search history.

(56) References Cited

U.S. PATENT DOCUMENTS

| | | | | |
|---|---|---|---|---|
| 3,995,173 A | * | 11/1976 | Sibley | 326/14 |
| 4,928,067 A | * | 5/1990 | Lind | 324/96 |
| 4,963,729 A | * | 10/1990 | Spillman et al. | 250/227.21 |
| 5,061,859 A | * | 10/1991 | Lovelace et al. | 250/551 |
| 5,089,948 A | * | 2/1992 | Brown et al. | 363/58 |
| 5,406,071 A | * | 4/1995 | Elms | 250/214 A |
| 5,742,417 A | * | 4/1998 | Whitney | 250/551 |
| 5,995,252 A | * | 11/1999 | Nemer et al. | 250/551 |
| 6,304,043 B1 | * | 10/2001 | Klostermeier | 315/360 |
| 6,570,146 B1 | * | 5/2003 | Emery et al. | 250/214 R |
| 6,800,867 B2 | * | 10/2004 | Maier | 250/551 |
| 2007/0171686 A1 | * | 7/2007 | Wohrle | 363/21.16 |

FOREIGN PATENT DOCUMENTS

| | | |
|---|---|---|
| CN | 1168586 A | 12/1997 |
| DE | 199 25 909 A1 | 12/2000 |
| EP | 0 798 885 A2 | 10/1997 |
| EP | 0 875 765 A1 | 11/1998 |

OTHER PUBLICATIONS

Schenk, C. & Tietze, U.; *Halbleiter-Schaltungstechnik*, 9 Aufl. Springer-Verlag, Berlin, Germany, pp. 110-111, (1991) ISBN 3-54-19475-4. (Statement of Relevance attached).

* cited by examiner

*Primary Examiner*—John R Lee
(74) *Attorney, Agent, or Firm*—Jerald L. Meyer; Derek Richmond; Robert T. Burns

(57) ABSTRACT

The invention relates to a circuit arrangement for the electrical isolation of signal lines, with an input (IN) for applying an input signal, an output (OUT) for releasing an output signal, and an initial branch (1) with an opto-coupler (OK) for optically coupling the input (TN) to the output (OUT), such that the input (IN) and the output (OUT) are connected in electrically isolated fashion by a second branch (2) with a capacitor (C1).

12 Claims, 1 Drawing Sheet

CIRCUIT ARRANGEMENT FOR THE ELECTRICAL ISOLATION OF SIGNAL LINES

This application is a non-provisional application of U.S. Provisional Application No. 60/764,379 filed Feb. 2, 2006, the contents of which are hereby incorporated by reference in their entirety.

FIELD

This subject matter relates to a circuit arrangement for the electrical isolation of signal lines.

BACKGROUND

In many applications the electrical isolation of circuits is necessary. For example, to permit flexibility in an application involving several sensors that are interconnected in a single apparatus, the outputs of these sensors should each be electrically isolated from a supply line. Furthermore, circuits that are positioned in surroundings exposed to the risk of explosion and that are designed with the so-called intrinsic safety type of protection must be electrically isolated from other circuits. Usually these circuits are isolated from each other by opto-couplers. Here a disadvantage rests in the fact that, for the transmission of fast alternating signals, the opto-couplers must be operated with a great deal of current in order for the output signal not to be delayed and distorted. In particular, the use of this and other known circuit arrangements is not possible for two-wire sensors with, e.g., a 4-20 mA interface, due to the lack of an appropriate current.

Known from U.S. Pat. No. 5,995,252 is a circuit arrangement with which fast alternating signals can be isolated with only a relatively small loss of power. Starting with an input, an input signal is applied over a capacitor and an ohmic resistor to two opto-couplers, one of which responds to positive and one to negative input signal portions. The outputs of the opto-couplers are merged and applied to a buffer, with an ohmic resistor connected in parallel to the buffer, in order to provide an output signal. A disadvantage rests in the fact that this circuit arrangement is only suitable for alternating current signals.

SUMMARY

The goal of the claimed subject matter is to propose a circuit arrangement which can transmit both direct and alternating signals, or the corresponding voltage signals, with only a slight loss of power.

This goal is achieved by a circuit arrangement with the features of claims 1 and 2. Advantageous embodiments are the subject matter of the dependent claims.

Preferred therefore is a circuit arrangement for the electrical isolation of signal lines, with an input for applying an input signal, an output for emitting an output signal, and an initial branch with an opto-coupler for optically coupling the input to the output, such that the input and the output are connected over a second branch that has at least one isolating component, for the purpose of transmitting dynamic portions of the input signal. This electrical isolation over the second branch is realized by a capacitor.

The basic concept embodied by this solution thus consists of transmitting static portions, which correspond to a HIGH or LOW state of the input signal, and dynamic portions, which consist of the slopes of the input signal, over two separate paths or branches and of rejoining them on the secondary side of the circuit arrangement.

An inverter for driving the capacitor will preferably be connected between the input and the capacitor. An output of the opto-coupler and a terminal of the capacitor on the output side can be advantageously interconnected. To this end, the output of the opto-coupler and a capacitor terminal on the output-side are connected in front of an input of the output inverter. The capacitor can be dimensioned specifically to have a capacitance value greater than 1 nF, and particularly greater than 10 nF.

An initial ohmic resistor will preferably be connected in front of the opto-coupler for drive purposes and a second ohmic resistor connected on the other side to register the state.

A buffer circuit will preferably be connected between the terminal of the capacitor on the output side and an output of the opto-coupler, thereby permitting the use of a capacitor with smaller dimensions. The buffer circuit will preferably exhibit a second capacitor on the output side. On the input side the buffer circuit will preferably exhibit a buffer, particularly in the form of an amplifier, with an ohmic resistor connected in parallel to it. The capacitor used for electrical isolation will ideally exhibit a small capacitance in this arrangement, with a value that is less than 1 nF.

BRIEF DESCRIPTION OF THE DRAWINGS

An exemplary embodiment is next described in greater detail on the basis of the drawing. Shown are.

DETAILED DESCRIPTION OF THE DRAWINGS

Figure 1:
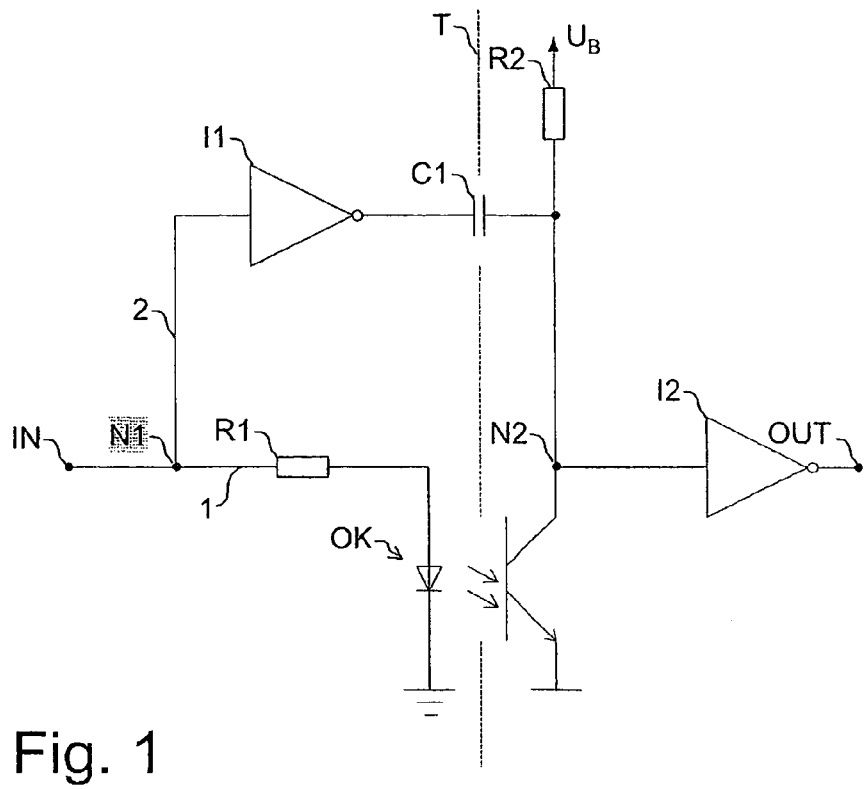
FIG. 1 an initial exemplary circuit arrangement for isolating signal lines.

FIG. 1 depicts, by way of example, the components of a circuit arrangement for the electrical isolation of signal lines, while showing only the components necessary for an understanding of the basic principle. Additional components may be inserted by way of modification, for example, to change or delay the signal.

An input signal is applied by an input IN to an initial node N1. The input IN is applied by this first node N1 and an initial ohmic resistor R1 to an opto-coupler OK. An output of the opto-coupler OK is applied to a second node N2. A second ohmic resistor R2 is connected between the second node N2 and a supply voltage UB in order to provide a slight current for detecting the state of the opto-coupler OK. The second node N2 may itself form an output. The depicted components describe an initial branch 1 of the circuit arrangement for transmitting static portions of the input signal.

A second branch for transmitting dynamic portions, which consist of the slopes of the input signal, leads from the first node N1, or the input IN, over an inverter I1 and a capacitor C1, to a second node N2. In this circuit arrangement the electrical isolation T is thus realized both by the opto-coupler OK and by the capacitor C1.

An ouput inverter I2 will preferably be connected between the second node N2 and an OUT output.

In this first circuit arrangement an alternating signal is thus fed directly from the input IN over the second branch 2 to the output inverter I2 via a capacitor C1 without a buffer, together with the static signal from the opto-coupler OK over the first branch 1. In such a design it is useful for the capacitor C1 to have the relatively large value of, e.g., 100 nF. Depending on the required voltage resistance of the electrical isolation, however, this will result in the capacitor C1 having a very large size.

Figure 2:
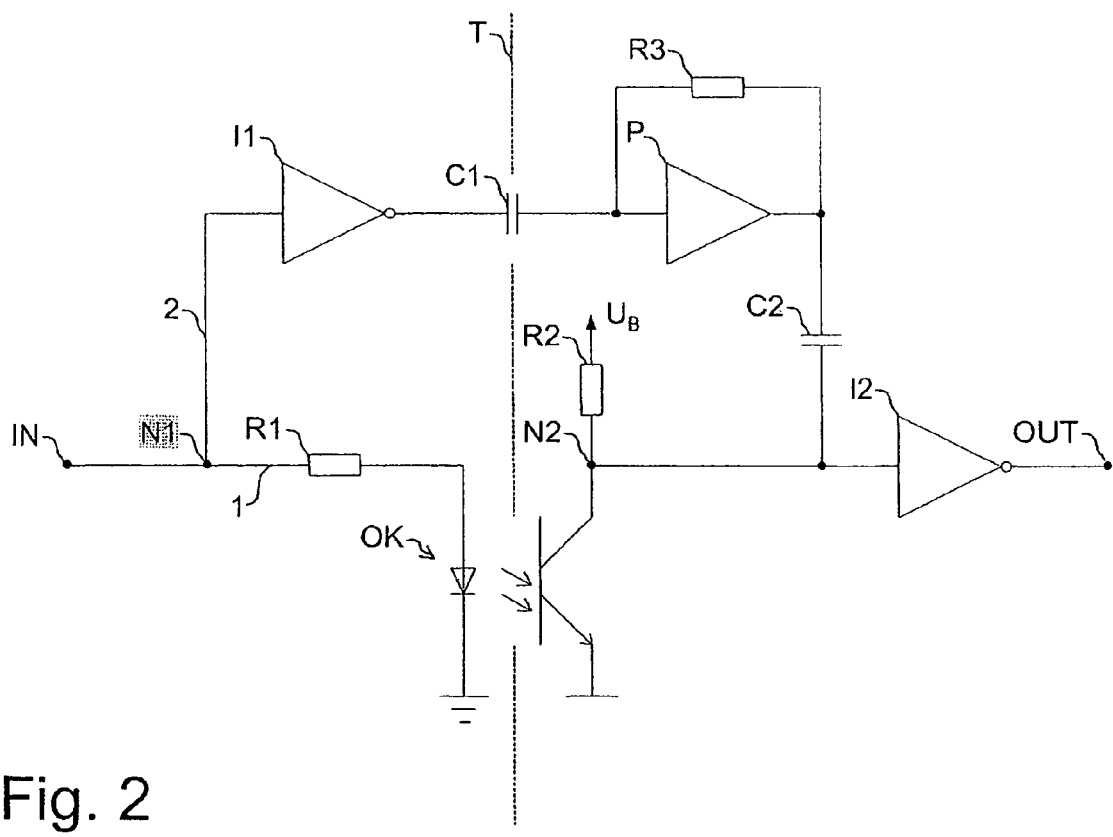
FIG. 2 a second circuit arrangement modified from the original circuit arrangement.

FIG. 2 shows a circuit arrangement which permits the use of a capacitor C1 with a small capacitance value. To avoid repetition, in the following only features that differ from the circuit depicted in FIG. 1 will be described. While the first branch 1 can be left unmodified, the second branch 2 exhibits a buffer circuit on the secondary side, between the capacitor C1 and the second node N2. The buffer circuit consists of a buffer P, in the form of, e.g., an amplifier, and a second capacitor C2, which is connected after the capacitor P. Advantageously connected in parallel to the buffer P is a third ohmic resistor R3.

The transmission of the static state of the input signal is again realized in a known manner with the opto-coupler OK, which is driven by the first resistor R1. Since only HIGH or LOW transmitted states are involved here, only a small drive current is necessary. On the secondary side of the first branch 1, a small current across the second resistor R2 also suffices to detect the state of the opto-coupler OK. The polarity is corrected with the output inverter I2, so that the input signal and the output signal have the same state. The first branch 1 thus serves only to transmit static or very slowly changing alternating voltages.

In order to correct the slopes of faster alternating signals, the dynamic portions of the input signals are transmitted in the second branch 2. For the purpose of electrical isolation the capacitor C1 is used here; this capacitor C1 is driven by the inverter I1 connected in front of it. Since only the slope has to be transmitted over the second branch 2, in the circuit arrangement of FIG. 2 a relatively small capacitance of, e.g., 100 pF is sufficient, and thus a capacitance that is preferably less than 1 nF. This is an advantage, since the capacitor C1 must exhibit the electric strength for which the potential isolation of the circuit arrangement is designed. The result is that the capacitor has a small overall size. This is permitted by the fact that on the secondary side of the second branch 2 the slopes of the input signal are registered by the buffer P. Due to the third resistor R3 connected in parallel to the buffer P there is positive feedback that ensures self-maintenance of the given state. The output signal of the parallel arrangement involving the buffer P and the third resistor R3 is transmitted via the second capacitor C2 to the output inverter I2, together with the static signal from the opto-coupler OK.

The invention claimed is:

1. A circuit arrangement for the electrical isolation of signal lines, comprising:
   an input (IN) for applying an input signal,
   an output (OUT) for emitting an output signal, and
   an initial branch (1) with an opto-coupler (OK) for optically coupling the input (IN) to the output (OUT),
wherein:
   the input (IN) and the output (OUT) are connected by a second branch (2) with at least one capacitor (C1), for the purpose of transmitting a changing portion of the input signal; and
   an inverter (I1) for driving the capacitor (C1) is connected between the input (IN) and the capacitor (C1).

2. A circuit arrangement for the electrical isolation of signal lines, comprising:
   an input (IN) for applying an input signal,
   an output (OUT) for releasing an output signal, and
   an initial branch (1) with an opto-coupler (OK) for optically coupling the input (IN) to the output (OUT),
wherein:
   the input (IN) and the output (OUT) are connected in electrically isolated fashion by a second branch (2) with a capacitor (C1);
   the second branch (2) is connected in parallel to the initial branch (1); and
   an inverter (I1) for driving the capacitor (C1) is connected between the input (IN) and the capacitor (C1).

3. A circuit arrangement according to claim 2, wherein an output of the opto-coupler (OK) and an output-side terminal of the capacitor (C1) are connected together (N2).

4. A circuit arrangement according to claim 3, wherein the output of the opto-coupler (OK) and an output-side terminal of the capacitor (C1) are connected in front of an input of an input inverter (I2).

5. A circuit arrangement according to claim 2, wherein
   an initial ohmic resistor (R1) is connected in front of the opto-coupler (OK) for drive purposes and
   a second ohmic resistor (R2) is connected on an other side of the opto-coupler (OK) for the purpose of registering the state.

6. A circuit arrangement according to claim 2, wherein a buffer circuit (P, R3, C2) is connected between an output-side terminal of the capacitor (C1) and an output of the opto-coupler (OK).

7. A circuit arrangement according to claim 6, wherein the buffer circuit comprises a second capacitor (C2) on the output side.

8. A circuit arrangement according to claim 6, wherein the buffer circuit comprises a buffer (P) on the input side, with an ohmic resistor (R3) connected in parallel to the buffer.

9. A circuit arrangement according to claim 2, wherein capacitor (C1) has a capacitance value greater than 1 nF.

10. A circuit arrangement according to claim 6, wherein the capacitor (C1) has a small capacitance value of less than 1 nF.

11. A circuit arrangement according to claim 8, wherein the buffer (P) is an amplifier.

12. A circuit arrangement according to claim 2, wherein the capacitor (C1) has a capacitance value greater than 10 nF.

* * * * *